US012646841B2

(12) United States Patent
Tiwari

(10) Patent No.: US 12,646,841 B2
(45) Date of Patent: Jun. 2, 2026

(54) LOW PROFILE LOW BAND DIPOLE FOR SMALL CELL ANTENNAS

(71) Applicant: JOHN MEZZALINGUA ASSOCIATES, LLC., Liverpool, NY (US)

(72) Inventor: Anoop Tiwari, Syracuse, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 99 days.

(21) Appl. No.: 18/693,835

(22) PCT Filed: Jul. 14, 2023

(86) PCT No.: PCT/US2023/027771
§ 371 (c)(1),
(2) Date: Mar. 20, 2024

(87) PCT Pub. No.: WO2024/015572
PCT Pub. Date: Jan. 18, 2024

(65) Prior Publication Data

US 2024/0387995 A1 Nov. 21, 2024

Related U.S. Application Data

(60) Provisional application No. 63/389,119, filed on Jul. 14, 2022.

(51) Int. Cl.
*H01Q 5/42* (2015.01)
*H01Q 21/26* (2006.01)
*H01Q 25/00* (2006.01)

(52) U.S. Cl.
CPC ............... *H01Q 5/42* (2015.01); *H01Q 21/26* (2013.01); *H01Q 25/001* (2013.01)

(58) Field of Classification Search
CPC ........ H01Q 5/42; H01Q 21/26; H01Q 25/001; H01Q 1/246
See application file for complete search history.

(56) References Cited

U.S. PATENT DOCUMENTS

| | | | |
|---|---|---|---|
| 10,958,316 | B2 | 3/2021 | Bisiules et al. |
| 11,205,852 | B2 | 12/2021 | Wu et al. |
| 11,515,622 | B2 | 11/2022 | Hou et al. |

(Continued)

FOREIGN PATENT DOCUMENTS

| | | | | |
|---|---|---|---|---|
| EP | 2727183 B1 * | 11/2016 | ........... | H01Q 11/105 |
| WO | WO-2019009951 A1 * | 1/2019 | ............... | H01Q 9/16 |
| WO | WO-2021150365 A1 * | 7/2021 | ............. | H01Q 21/26 |

*Primary Examiner* — Seokjin Kim
(74) *Attorney, Agent, or Firm* — BRYAN CAVE LEIGHTON PAISNER LLP

(57) ABSTRACT

A multiband antenna has an array face with closely spaced dipoles of multiple frequency bands in the low band, the mid band, and C-band or CBRS (Citizens Broadband Radio Service). The low band dipole has four dipole arms formed in a plurality of loops from a single piece of metal. In one embodiment, the loops successively decrease in dimension, resulting in a tapered dipole arm shape and has a bend that bends the dipole arms downward to accommodate radome curvature. In a second embodiment, the outermost loop of each dipole arm is larger in volume and has its lateral loop features bent downward.

17 Claims, 15 Drawing Sheets

(56) References Cited

U.S. PATENT DOCUMENTS

| | | | | |
|---|---|---|---|---|
| 11,611,143 | B2 | 3/2023 | Hou et al. | |
| 11,621,755 | B2 | 4/2023 | Wu et al. | |
| 11,664,600 | B2 | 5/2023 | Wu et al. | |
| 2017/0264021 | A1 | 9/2017 | Heyde et al. | |
| 2018/0323513 | A1 | 11/2018 | Varnoosfaderani et al. | |
| 2020/0328533 | A1* | 10/2020 | Sundararajan | H01Q 1/246 |
| 2021/0359414 | A1* | 11/2021 | Sundararajan | H01Q 1/521 |
| 2021/0391655 | A1 | 12/2021 | Brobston et al. | |
| 2023/0082093 | A1 | 3/2023 | Pollayi et al. | |
| 2023/0170957 | A1 | 6/2023 | Zimmerman et al. | |
| 2024/0088566 | A1* | 3/2024 | Somersalo | H01Q 1/288 |

* cited by examiner

LOW PROFILE LOW BAND DIPOLE FOR SMALL CELL ANTENNAS

CROSS-REFERENCE TO RELATED APPLICATIONS

This application is a National Stage Application of International Application No. PCT/US23/27771 filed on Jul. 14, 2023, which claims the benefit of U.S. Provisional Application No. 63/389,119, filed on Jul. 14, 2022, all of which are incorporated by reference in their entirety herein.

BACKGROUND OF THE INVENTION

Field of the Invention

The present invention relates to wireless communications, and more particularly, to compact multiband cellular antennas.

Related Art

The proliferation of numerous new frequency bands in cellular communications has increased demand for antennas that operate in multiple bands. Further, the proliferation of small cell antenna deployments in dense urban settings has increased pressure on antenna designers to make small cell antennas as compact as possible while providing multiband capability as well as 360 degree coverage. These opposing design pressures require antenna designers to place antenna dipoles of different frequency bands in closer proximity to each other within a very compact cylindrical radome. Placing dipoles of different frequency bands in close proximity to each other exacerbates inter-band interference and re-radiation, which degrades antenna performance.

Low Band (LB) dipoles, being the largest of the dipoles within a multiband antenna, suffer the most from inter-band interference because they are the largest, and densifying multiband antenna dipole layouts requires that the arms of LB dipoles extend over and overlap with dipoles covering other frequency ranges such as mid band (MB) (1695-2690 MHz), C-Band and CBRS (Citizens Broadband Radio Service) (3.4-4.2 GHZ). Conventional cloaking techniques exist to mitigate LB dipole coupling and re-radiation with these other frequency bands, but there are limits to the effectiveness of conventional techniques. Further, being the largest, LB dipoles suffer most from design constraints such as small cell radome dimensions.

Accordingly, what is needed is a LB dipole design that is effectively transparent in the MB, C-Band and CBRS frequency ranges, and that may be located in close proximity to these other band dipoles to meet antenna densification demands and may conform to the tight spaces endemic to a cylindrical small cell antenna.

SUMMARY OF THE DISCLOSURE

An aspect of the present disclosure involves a multiband antenna. The multiband antenna comprises a plurality of first dipoles configured to radiate in a first frequency band; and one or more second dipoles configured to radiate in a second frequency band, wherein the first frequency band is higher than the second frequency band, the one or more second dipoles each having four dipole arms, wherein each of the four dipole arms is formed of a single piece of metal and has a coupling loop and a plurality of arm loops.

DESCRIPTION OF EXEMPLARY EMBODIMENTS

Figure 1A:
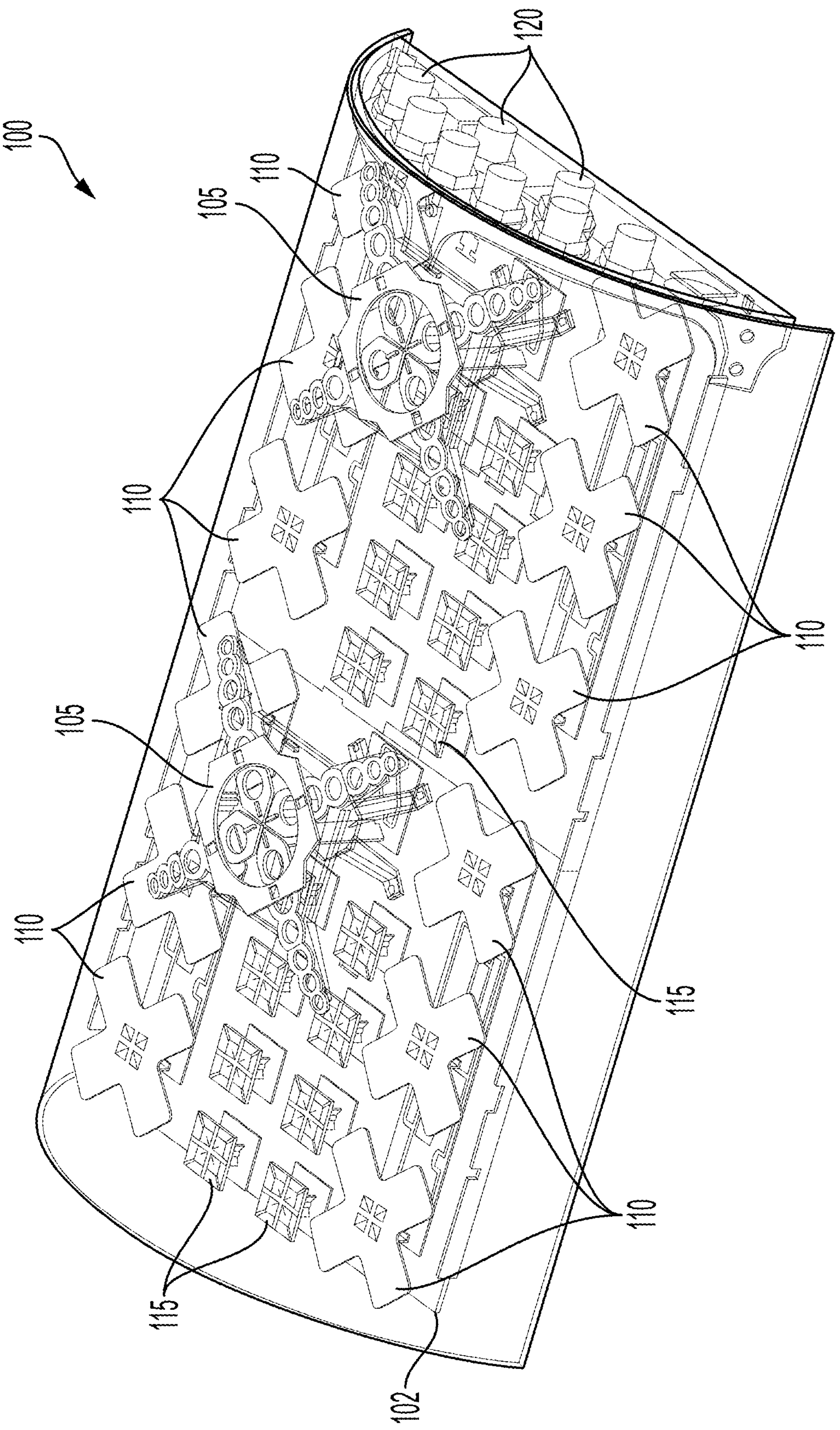
FIG. 1A illustrates a single sector antenna array face of a cylindrical small-cell antenna having an exemplary LB dipole according to the disclosure.

FIG. 1A illustrates a single sector antenna array face 100 of a cylindrical small-cell antenna. Antenna array face 100 has a reflector plate 102 on which are disposed two exemplary LB dipoles 105; twelve MB dipoles 110, and two subarrays of eight C-Band or CBRS dipoles 115. Exemplary array face 100 may cover a 120 degree sector such that three array faces 100 mechanically coupled and deployed within a cylindrical radome to provide 360 degrees of coverage in an azimuth plane. Also illustrated is a plurality of signal ports 120, which couple RF cables (not shown) from a base station or signal source (also not shown) to the LB dipoles 105, MB dipoles 115, and C-Band/CBRS dipoles 115. From the illustration in FIG. 1A it will be apparent that the dipoles 105/110/115 are packed closely together, and that the two LB dipoles 105 have dipole arms that stretch out, shadowing MB dipoles 110 and C-Band/CBRS dipoles 115.

Figure 1B:
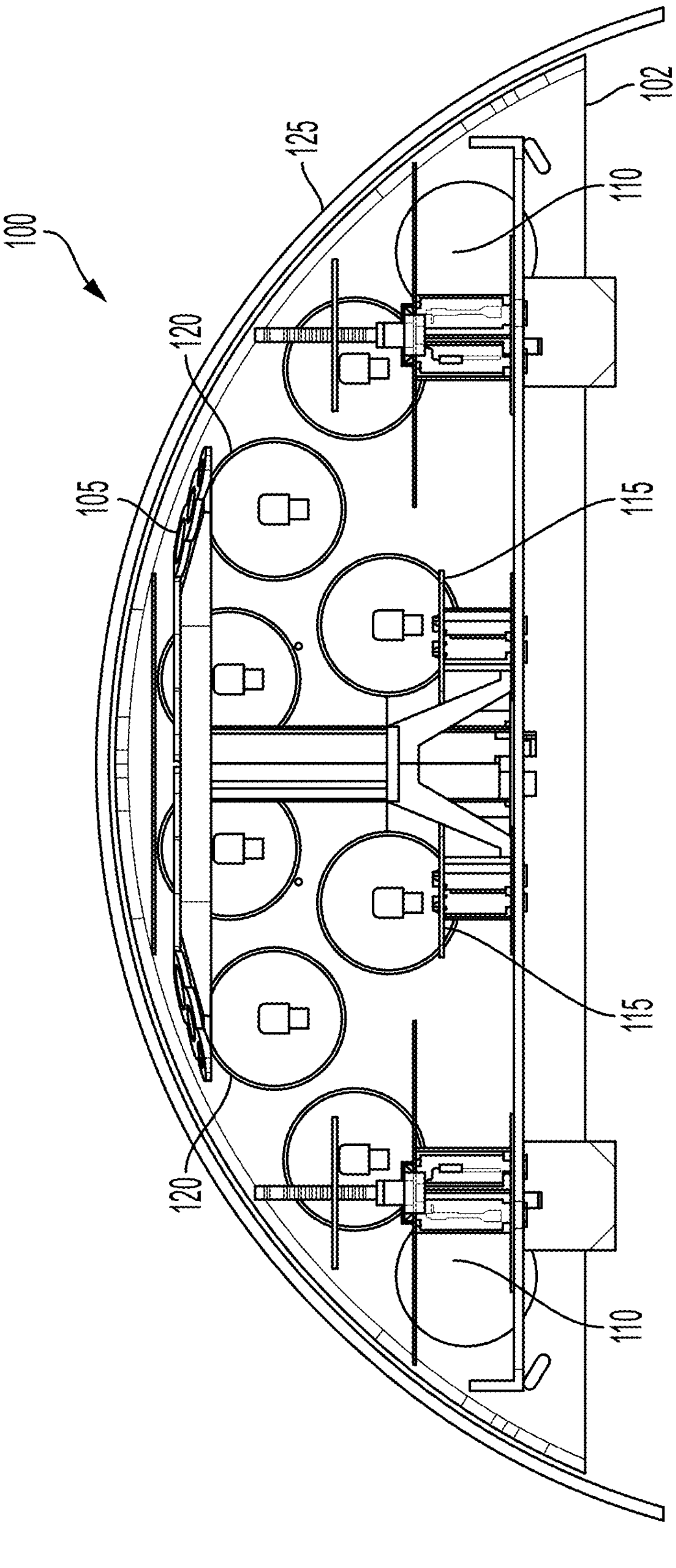
FIG. 1B is a side view of the sector antenna array face of FIG. 1A.

FIG. 1B is a side view of sector antenna array face 100. As illustrated, LB dipole 105 (there are two but one is visible at this perspective) is disposed on reflector plate 102, along with MB dipoles 110 and C-Band/CBRS dipoles 115. As illustrated, LB dipole 105 has dipole arms that have a bend to fit within the confines of radome 120, as is described further below.

Figure 2:
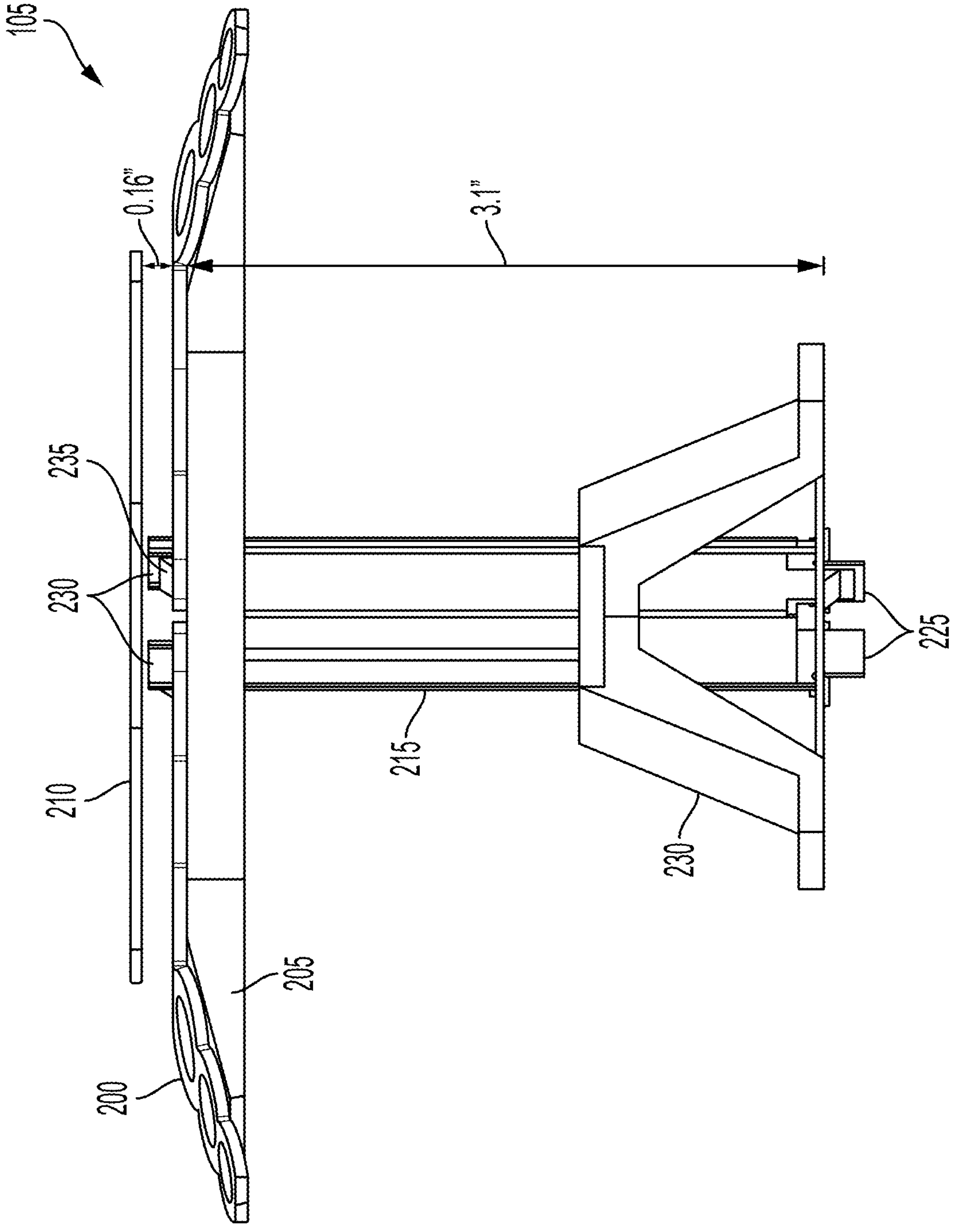
FIG. 2 illustrates an exemplary LB dipole according to a first embodiment of the disclosure.

FIG. 2 is a side view of exemplary LB dipole 105. LB dipole 105 has four dipole arms 200 that are supported by a support structure 205: a passive radiator 210 that is disposed above the four dipole arms 200; and a balun stem 215 that has signal traces that couple RF signals to the dipole four dipole arms 200. Balun stem 215 has tabs 230 that extend through the four dipole arms 200 and couple signal feed traces (not shown) on the balun stem 215 to the dipole arms 200 via solder joints 235. Balun stem 215 may be supported by a second support structure 220; and may have signal feeds 225 that couple signal feed traces to a feed circuit (not shown). FIG. 2 includes exemplary dimensions, such as the height of passive radiator 210 over dipole arms 200 (0.16 inch), and the height of dipole arms 200 over reflector plate 102 (3.1 inch). It will be understood that these dimensions are exemplary.

Figure 3:
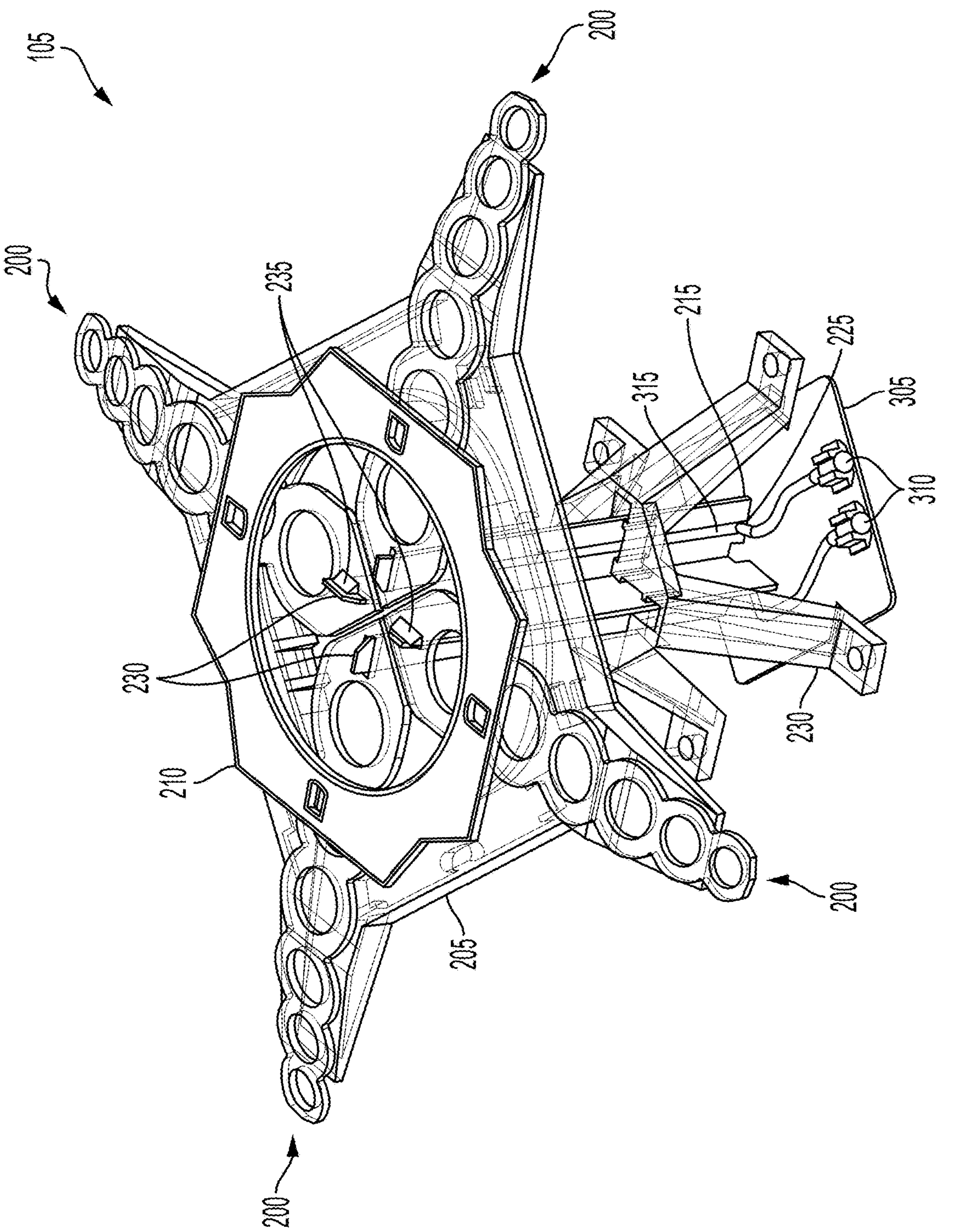
FIG. 3 illustrates the exemplary LB dipole of FIG. 2 with its non-conductive infrastructure components rendered transparent.
Figure 4:
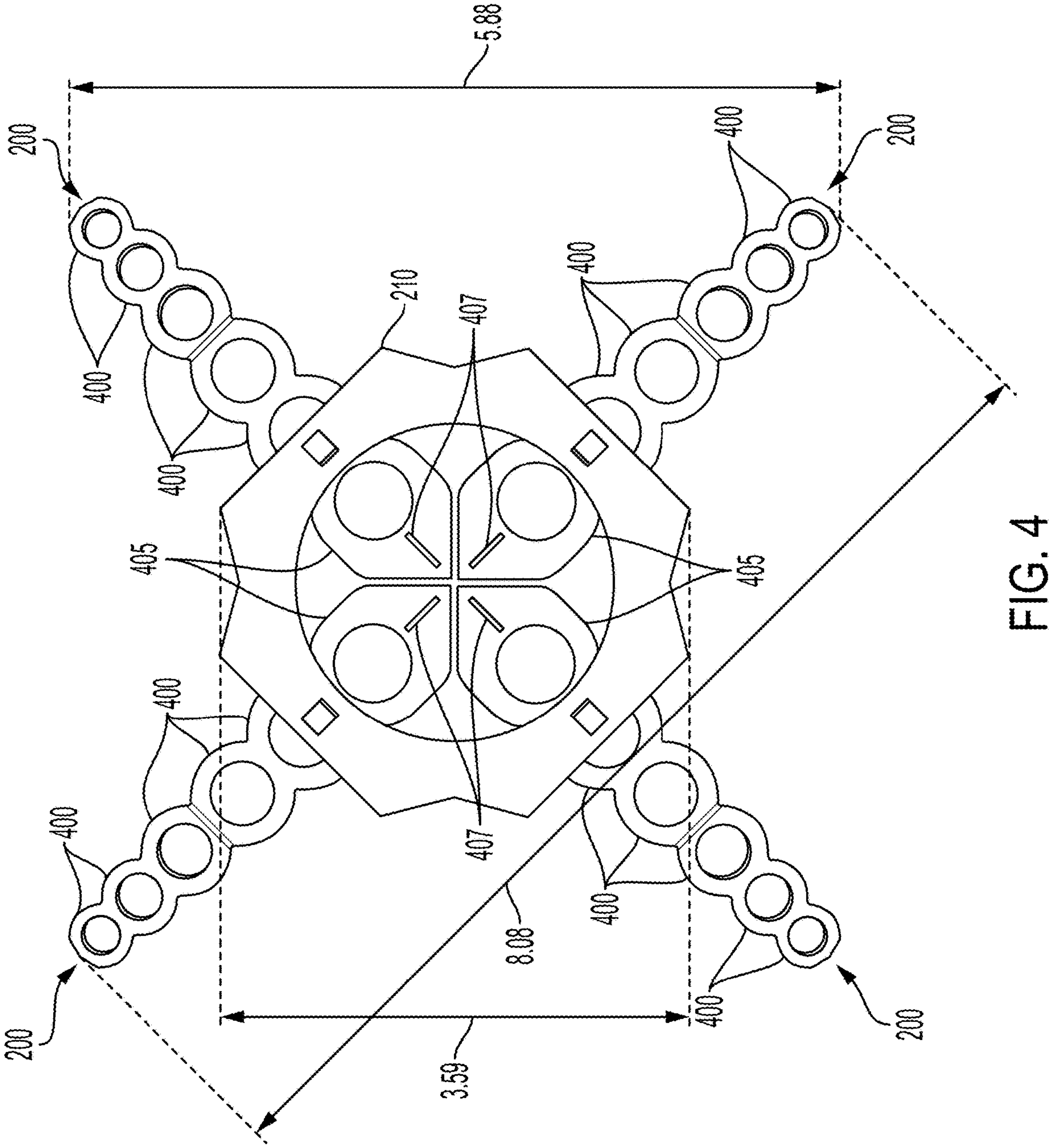
FIG. 4 is a top-down view of the exemplary LB dipole of FIG. 2, showing four dipole arms and its passive radiator.

FIG. 3 illustrates exemplary LB dipole 105 with support structures 205 and 220 rendered transparent for the sake of illustration. Illustrated are four dipole arms 200 disposed on support structure 205, and passive radiator 210 disposed above the four dipole arms 200. The perspective of FIG. 3 illustrates how each dipole arm 200 mechanically couples to a corresponding tab 230 and electrically couples to a corresponding signal feed traces 315 via solder joints 235. Further illustrates is a feed circuit 305 having two feed signal feeds 310 that electrically couple to corresponding signal feed traces 315 disposed on balun stem 215. FIG. 4 is a top-down view of the four radiator arms 200 and passive radiator 210 of exemplary LB dipole 105. Each of the four dipole arms 200 may be characterized as fractal dipole structures, whereby each has a scaled repeating geometry for overall desired dipole length. Each dipole arm 200 has a repeating pattern of arm loops 400 that decrease in dimension, e.g., the width or diameter of each loop as illustrated, from inner coupling loop 405 outward. Each coupling loop 405 has a slot 407 for mechanically engaging with corresponding tab 230 of balun stem 215 (not shown) and electrically coupling to solder joint 235 (not shown). Each dipole arm 200 may be formed of a single piece of stamped metal. For example, brass or aluminum of 60 mil thickness may be used.

Figure 5:
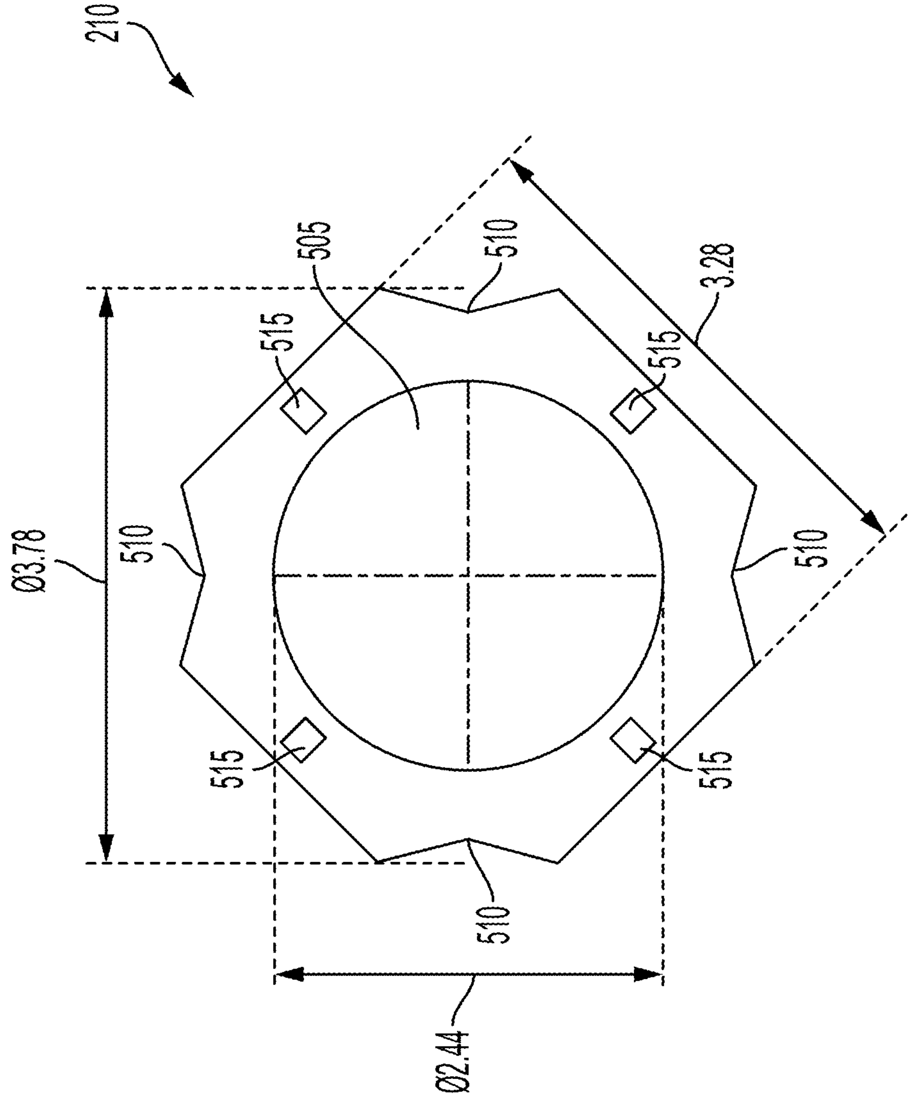
FIG. 5 illustrates an exemplary passive radiator component of the LB dipole of FIG. 2.

FIG. 5 illustrates exemplary passive radiator 210 along with exemplary dimensions. Passive radiator 210 has an aperture 505: four slots 510; and four mounting holes 515 for mounting to a support structure (not shown). Passive radiator 210 may be formed of a single piece of stamped metal. For example, brass or aluminum of 60 mil thickness may be used. Alternatively, passive radiator 210 may be formed of 40 mil/60 mil PCB with copper only on one side.

Figure 6:
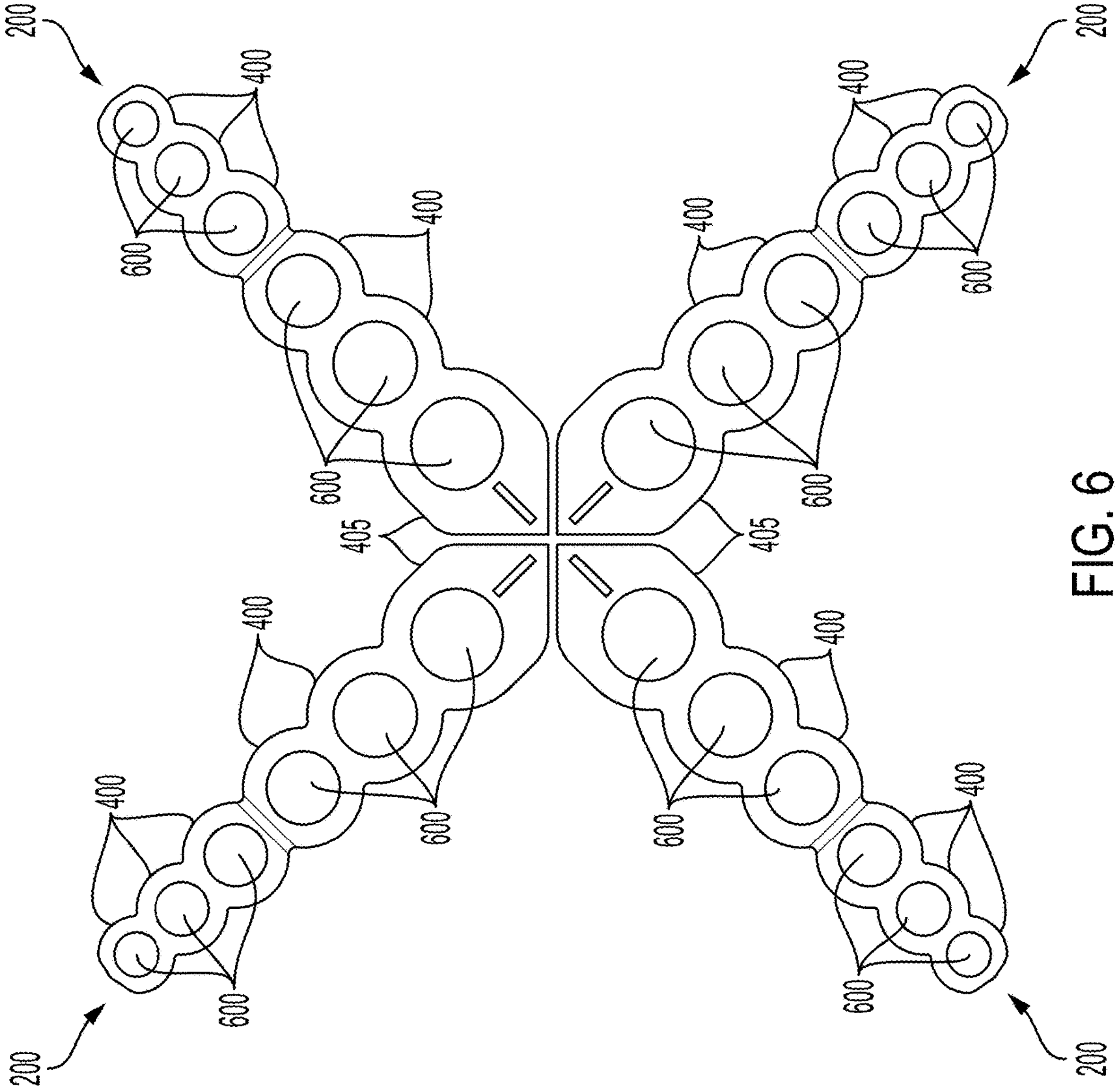
FIG. 6 illustrates four dipole arms of the exemplary LB dipole of FIG. 2 with the passive radiator omitted.

FIG. 6 illustrates the four dipole arms 200 with passive radiator 210 removed for the purposes of illustration. As illustrated, each dipole arm has a coupling loop 405 and five loops 400. Each coupling loop 405 and arm loop 400 has an aperture 600. The dimensions of each coupling loop 405, arm loop 400 and their respective apertures 600 provide cloaking against any impinging RF (Radio Frequency) energy emitted by nearby MB dipoles 110 or C-Band/CBRS dipoles 115. Further, as illustrated, each successive arm loop 400 for a given dipole arm 200 decreases in dimension successively from corresponding coupling loop 405, providing a tapered arm shape. The tapered shape further helps reduce MB/C-Band/CBRS coupling with dipole arm 200 because the reduced LB dipole area at the outer loops reduces the effective surface area of shadowing of dipole arm 200 over nearby MB dipoles 110 and C-Band-CBRS dipoles 115. Additionally, adding an outer loop 400 to the end of the four dipole arms 200 extends the LB frequency response of LB dipole 105 into the lower frequencies. For example, the outermost loop 400 of exemplary dipole arm 200 extends the frequency response of LB dipole 105 to 617 MHz, while its reduced area reduces interference with any MB dipoles 110 or C-Band/CBRS dipoles underneath it within exemplary array face 100.

Figure 7:
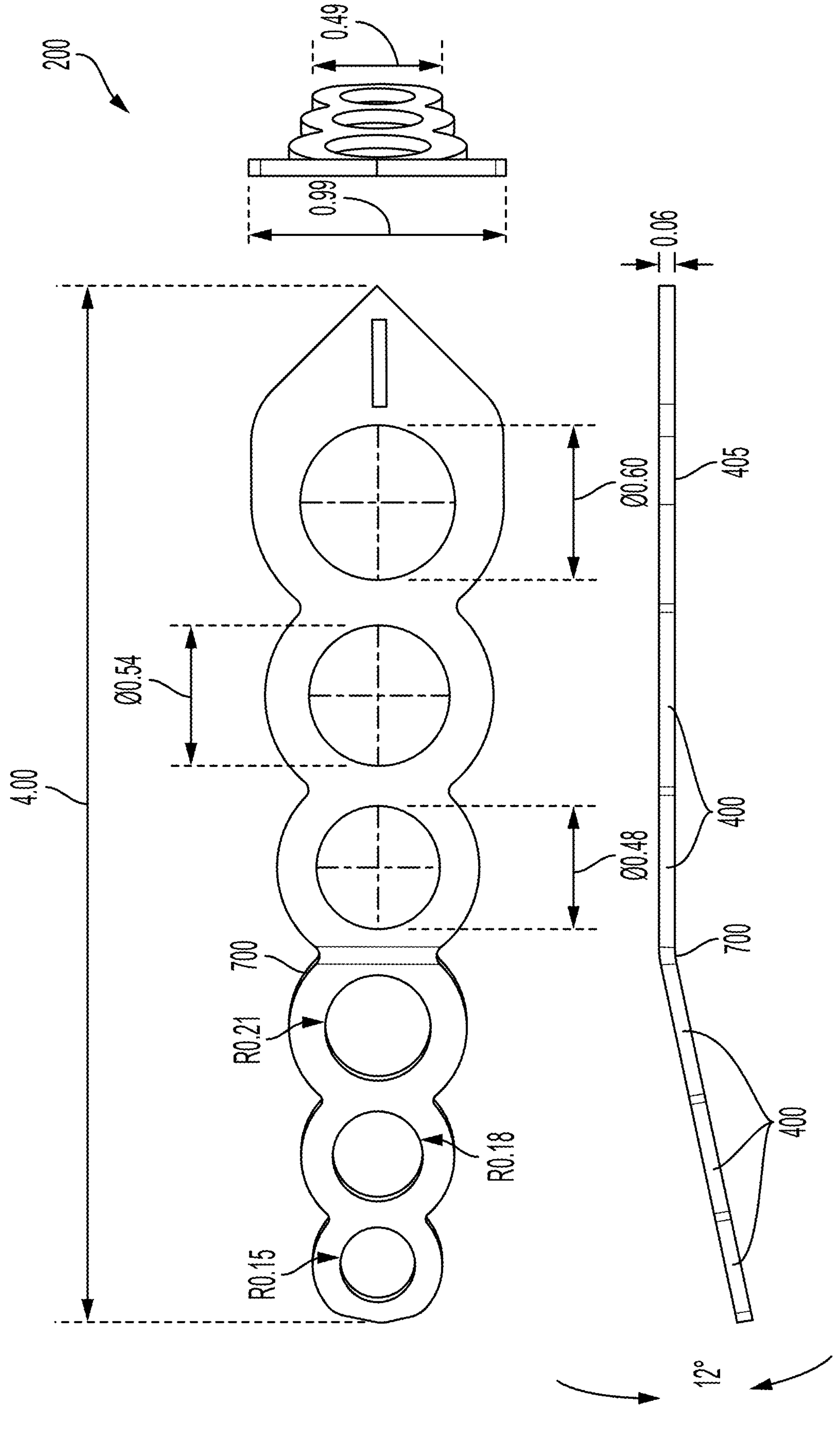
FIG. 7 provides three views of an dipole arm of the exemplary LB dipole of FIG. 2, with exemplary dimensions.

FIG. 7 provides three views of exemplary dipole arm 200, including exemplary dimensions (in inches) of coupling loop 405, arm loop 400, and corresponding apertures 600. FIG. 7 also illustrates the location for a bend 700 in dipole arm 200 that enables LB dipole 105 to fit within the constraints of radome 125. In the illustrated example, the bend 700 is a bend of 12 degrees and is located between the third and fourth arm loop 400 from the outer end of dipole arm 200. It will be understood that variations to the dimensions illustrated, the location of bend 700, and the angle of bend 700, are possible and within the scope of the disclosure.

Figure 8A:
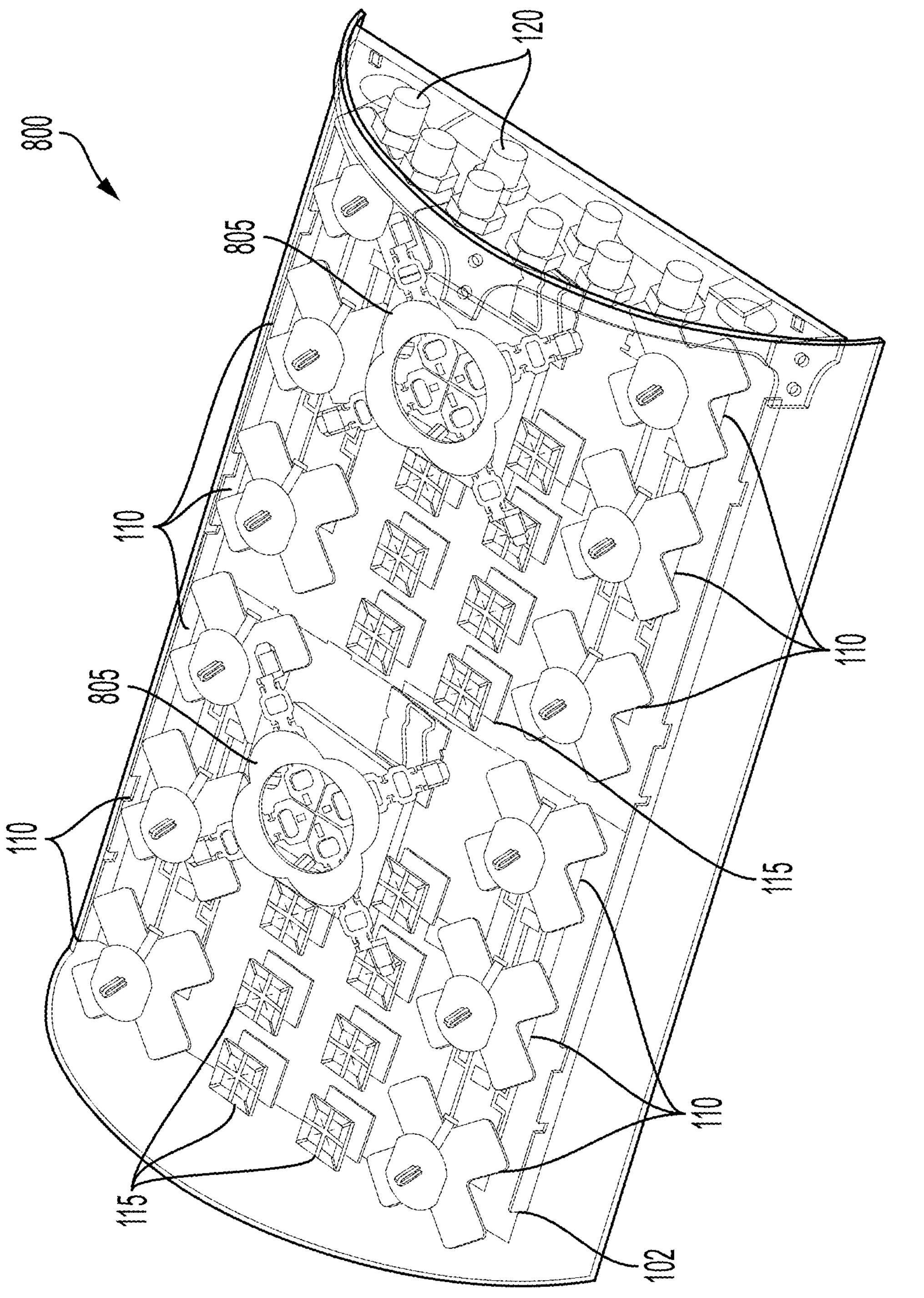
FIG. 8A illustrates a single sector antenna array face of a cylindrical small-cell antenna having an exemplary LB dipole of a second embodiment according to the disclosure.

FIG. 8A illustrates a single sector antenna array face 800 that is similar to array face 100, except that it has an LB dipole 805 that has a different dipole arm structure from the dipole arms 200 of LB dipole 105.

Figure 8B:
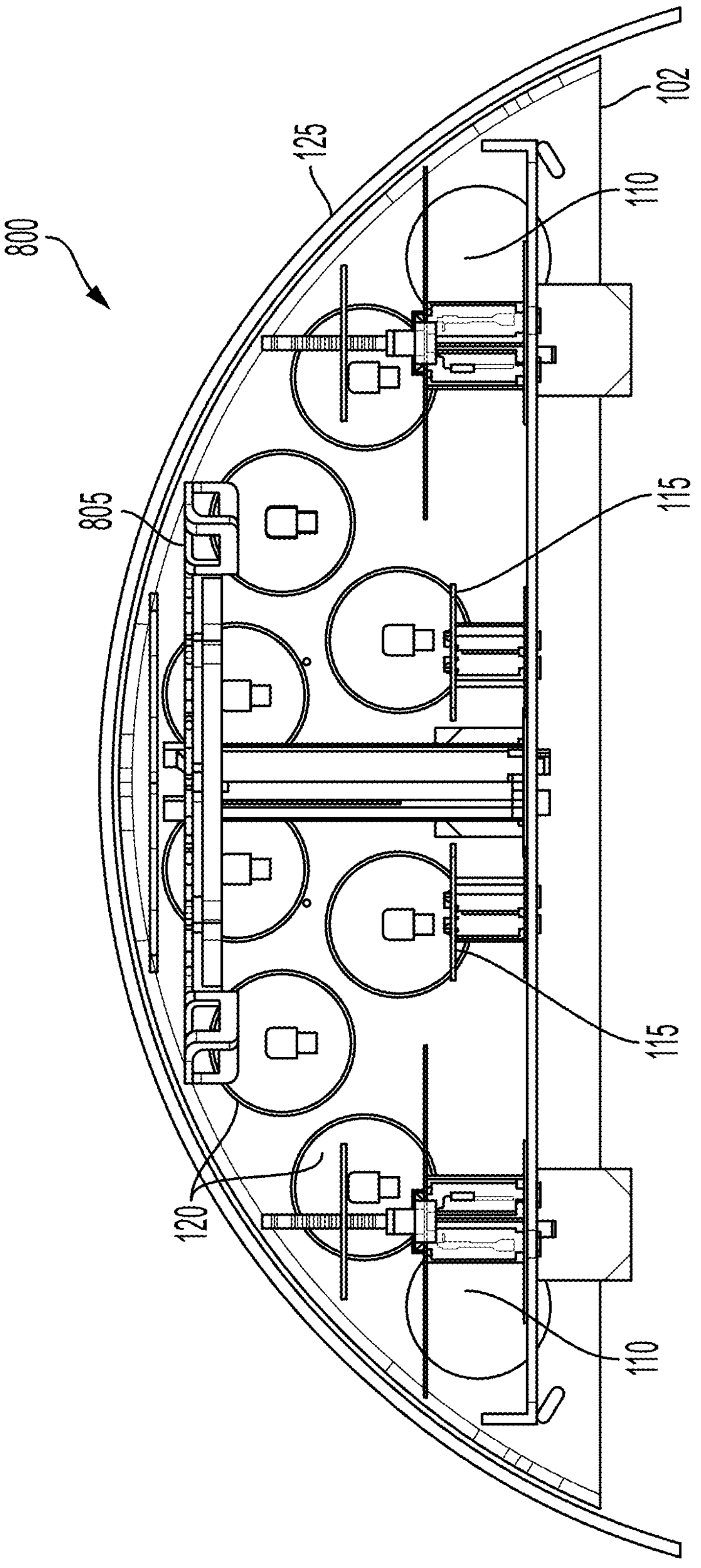
FIG. 8B is a side view of the sector antenna array face of FIG. 8A.

FIG. 8B is a side view of sector array face 800, providing a side view of LB dipole 805 as deployed within radome 125.

Figure 9:
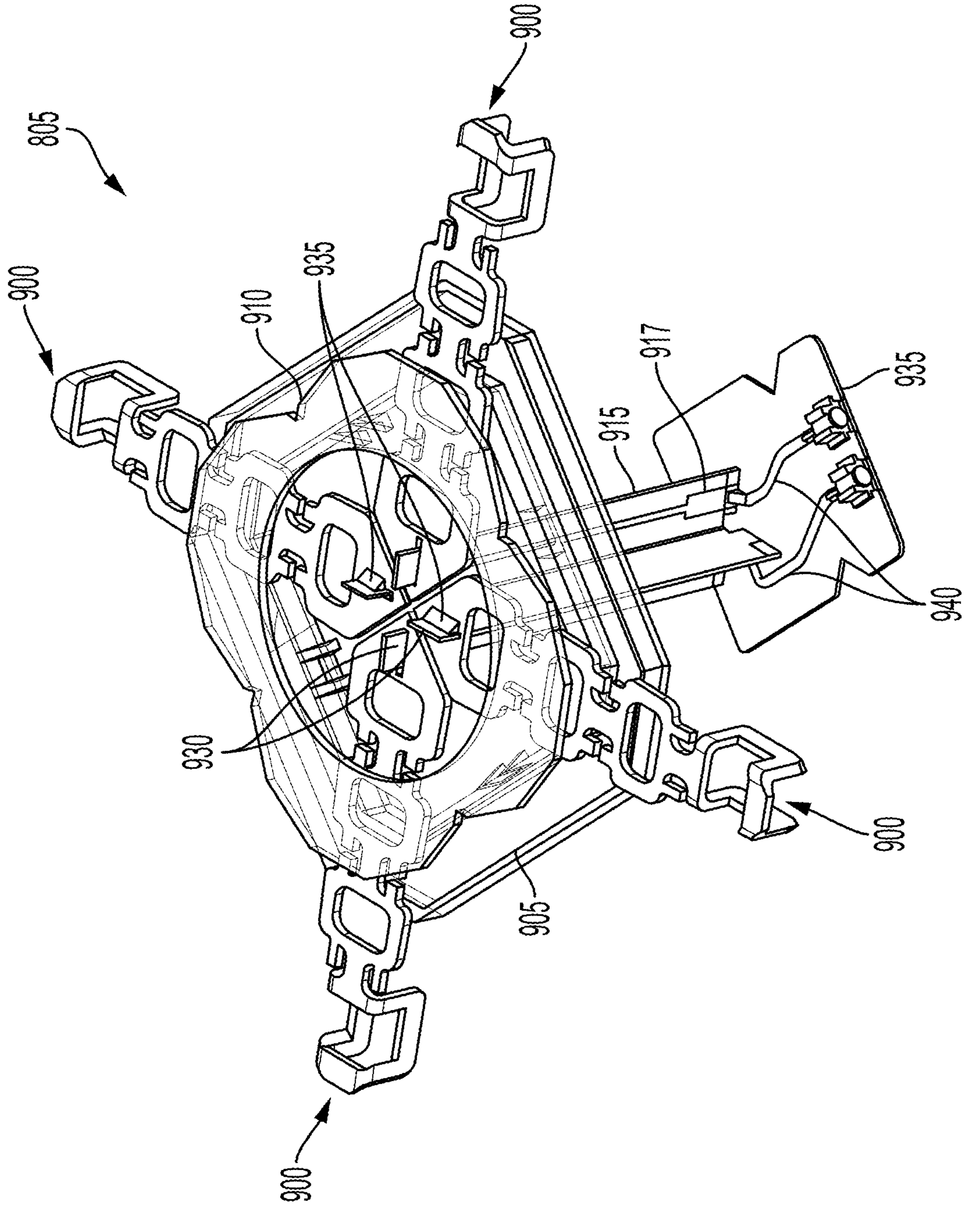
FIG. 9 illustrates the exemplary LB dipole of a second embodiment with certain components rendered transparent for the purposes of illustration.

FIG. 9 illustrates exemplary LB dipole 805, which has four dipole arms 900 that are disposed on a support structure 905: a passive radiator 910 that is disposed above the four dipole arms 900; and a balun stem 915, which may be similar to balun stem 215. Each dipole arm 900 is mechanically coupled to balun stem 915 by corresponding tabs 930 and electrically couples to a respective signal trace 917 via a corresponding solder joint 935. Signal traces 917 (only one is shown in the figure) couple to one of two RF signal feeds 940 disposed on feed circuit 935.

Figure 10:
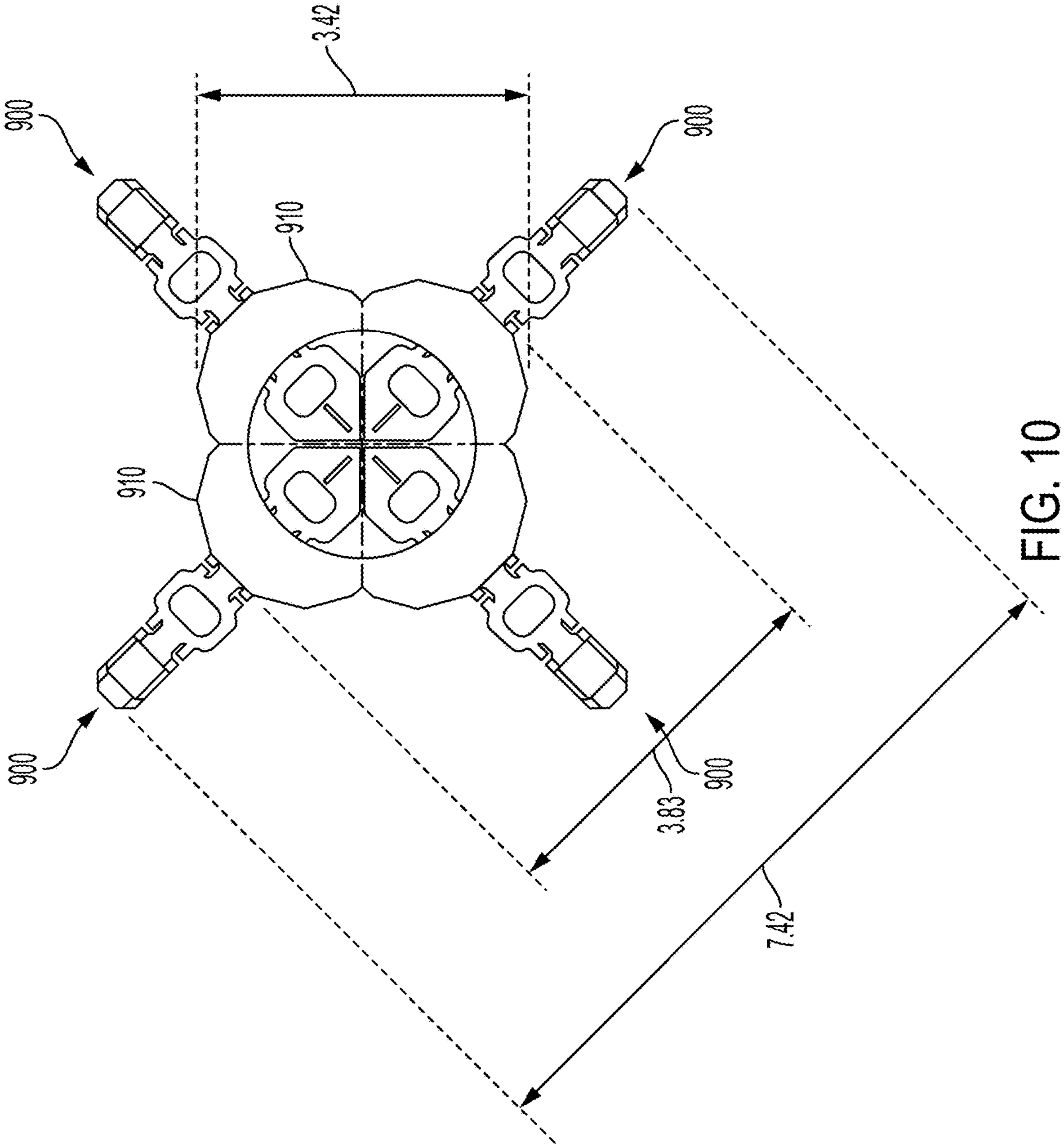
FIG. 10 is a top-down view of the exemplary LB dipole of FIG. 9, showing its four dipole arms and passive radiator.

FIG. 10 is a top-down view of the four radiator arms 900 and passive radiator 910 according to the disclosure, showing exemplary dimensions in inches.

Figure 11:
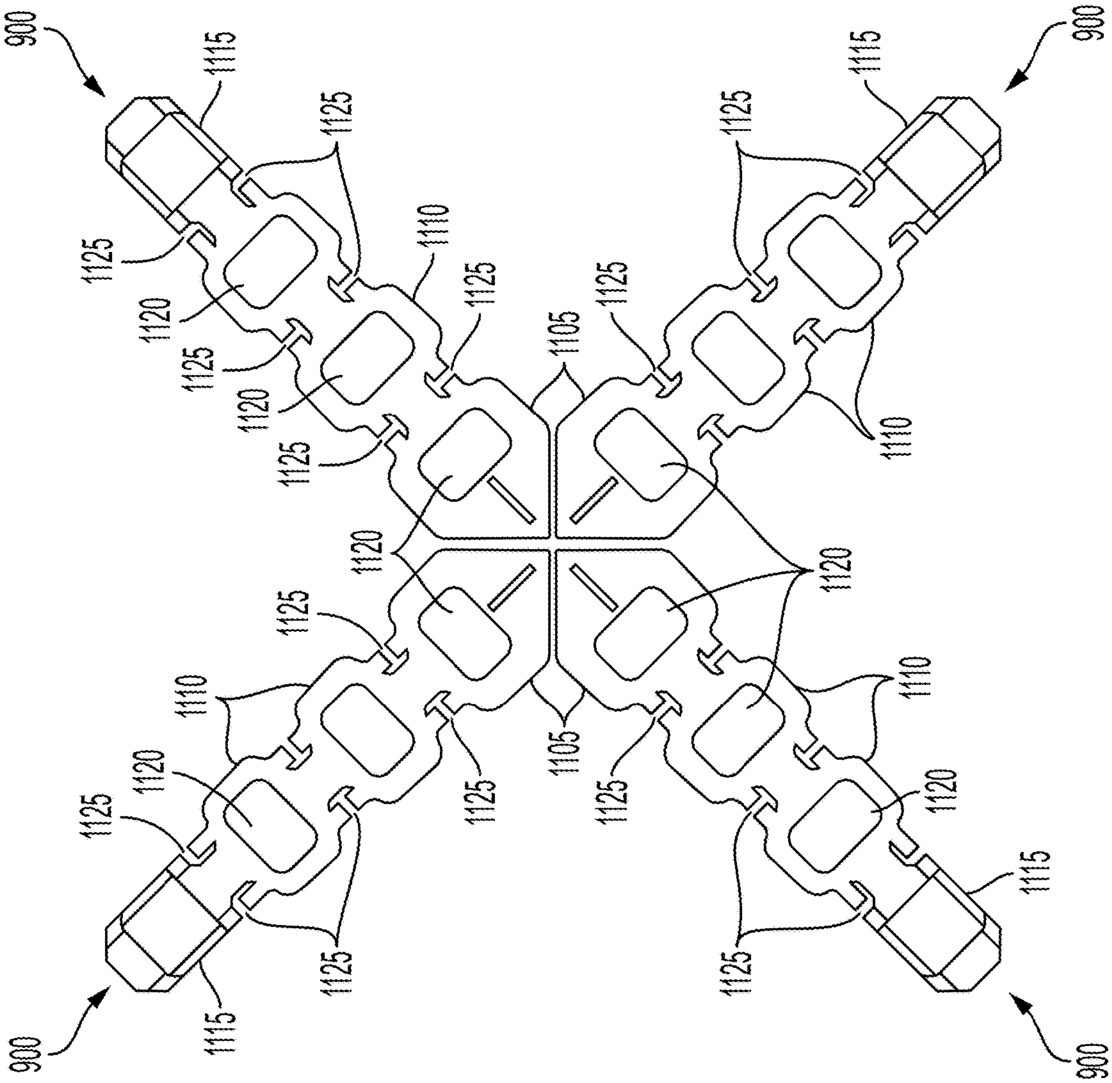
FIG. 11 is a top-down view of the four dipole arms of the LB dipole according to a second embodiment.

FIG. 11 illustrates the four dipole arms 900 of exemplary LB dipole 805 with the passive radiator 910 removed for purposes of illustration. As illustrated, each dipole arm 900 has a coupling loop 1105, two arm loops 1110, and an end loop 1115. Each of the loops 1105/1110/1115 have an aperture 1120; and between the loops 1105/1110/1115 are slotted tuning features 1125. The 'Tee' shaped features enhance the bandwidth of dipole arm 900 by narrowing down the width of the strip connecting two loops. This narrow width helps in mitigating some interference from MB/C-Band/CBRS dipoles placed under the LB dipole arms. End loop 1115 has a broader loop shape than the two arm loops 1110 but have their lateral loop features bent downward to reduce the shadowing of LB dipole arms 900 over adjacent MB/C-Band/CBRS dipoles 110/115 in array face 800, while maintaining volume.

Dipole arms 900 of LB dipole 805 may be shorter than dipole arms 200 of LB dipole 105. This is because end loop 1115 of LB dipole 900 has a greater volume (e.g., a greater volume of metal) than the outermost loops 400 of dipole arms 200. The additional volume and overall surface area of end loops 1115 allow dipole arm 900 to be shorter while enabling LB dipole 805 to have the same bandwidth performance as LB dipole 105.

Figure 12:
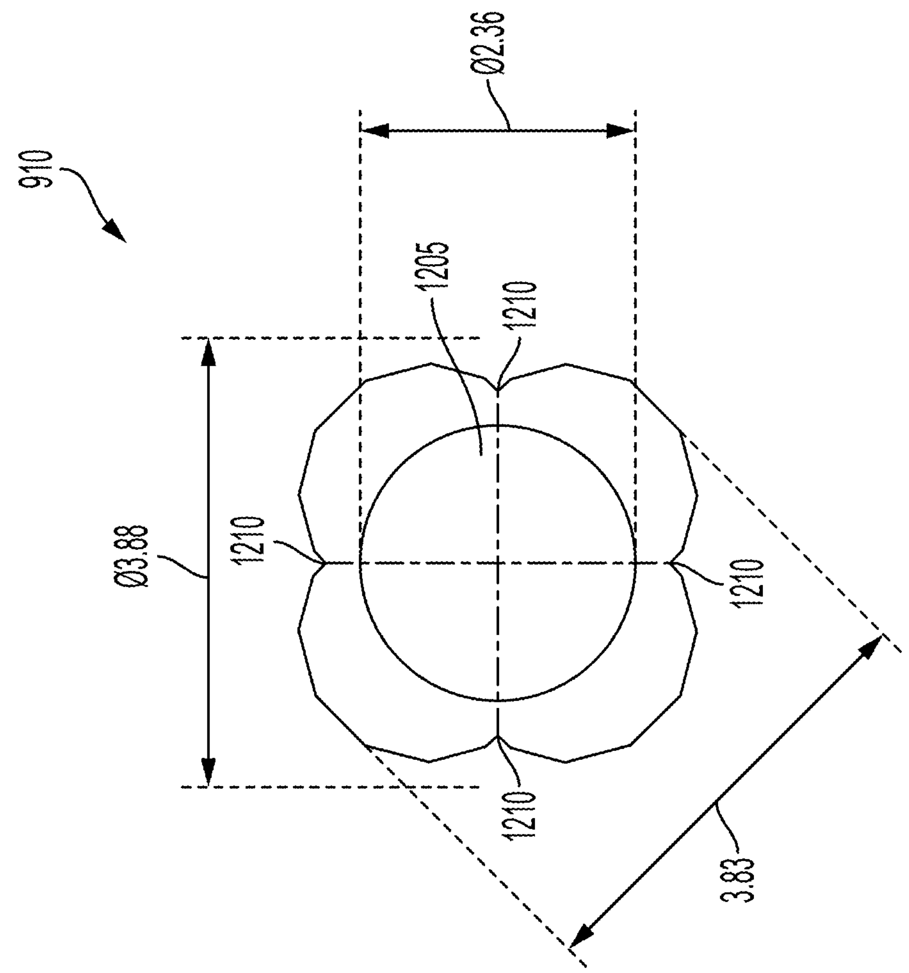
FIG. 12 illustrates a passive radiator of the LB dipole according to a second embodiment, along with exemplary dimensions.

FIG. 12 illustrates passive radiator 910 of LB dipole 805, including exemplary dimensions in inches. Passive radiator 910 has a plurality of slots 1210 and an aperture 1205. The function of slots 1210 and aperture 1205 may be the same as for the similar features of passive radiator 210 of LB dipole 105.

Figure 13:
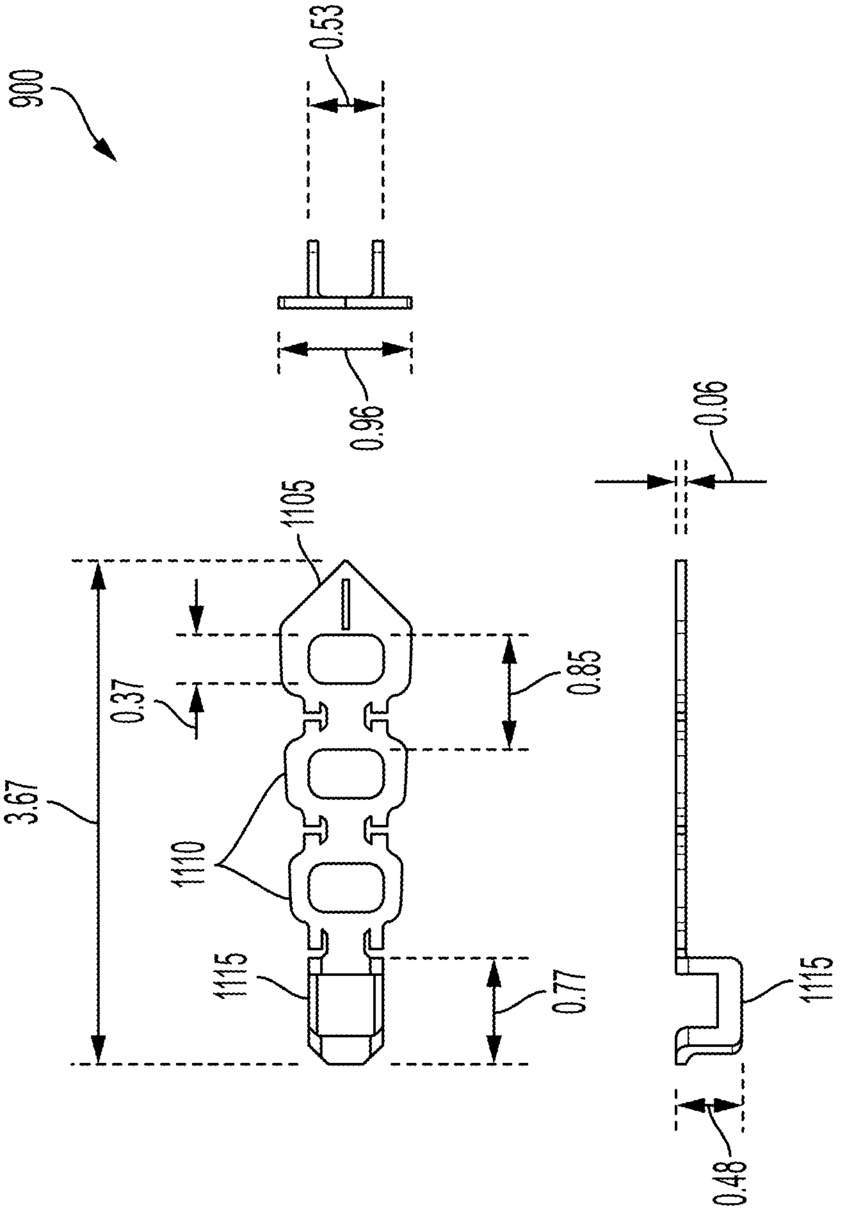
FIG. 13 provides three views of a radiator arm of the LB dipole according to a second embodiment.

FIG. 13 provides three views of dipole arm 900 of LB dipole 805, including exemplary dimensions in inches.

What is claimed is:

1. A multiband antenna, comprising:

a plurality of first dipoles configured to radiate in a first frequency band; and one or more second dipoles configured to radiate in a second frequency band, wherein the first frequency band is higher than the second frequency band, the one or more second dipoles each having a plurality of dipole arms, wherein each of the dipole arms comprises a plurality of loops, and wherein the plurality of loops of each dipole arm decrease in dimension from one loop to the next such that each dipole arm tapers in a direction towards an outer end of the dipole arm.

2. The multiband antenna of claim 1, wherein each of the dipole arms has a bend, the bend having an angle and a location along each dipole arm configured as a function of an interior surface of a radome associated with the multiband antenna.

3. The multiband antenna of claim 2, wherein the bend is located between two adjacent loops along each of the dipole arms.

4. The multiband antenna of claim 3, wherein the bend is closer to an outer end of each dipole arm than an inner end of each dipole arm.

5. The multiband antenna of claim 1, further comprising a passive radiator disposed above each of the plurality of dipole arms.

6. The multiband antenna of claim 5, wherein the passive radiator comprises:

an aperture; and a plurality of slots.

7. The multiband antenna of claim 1, wherein the first frequency band comprises a mid band.

8. The multiband antenna of claim 7, wherein the second frequency band comprises a low band.

9. The multiband antenna of claim 8, further comprising a third plurality of dipoles, wherein each of the third plurality of dipoles is configured to radiate in a third frequency band, wherein the third frequency band comprises one of a C-Band and a CBRS (Citizens Broadband Radio Service) band.

10. A Low Band (LB) dipole comprising:

a plurality of dipole arms; and a balun stem, wherein each of the dipole arms comprises:

an inner end and an outer end, and a plurality of loops, wherein the loop closest to the inner end of each dipole arm is mechanically coupled to the balun stem, wherein the plurality of loops of each dipole arm decrease in dimension from one loop to the next such that each dipole arm tapers in a direction towards an outer end of the dipole arm.

11. The LB dipole of claim 10, wherein each of the dipole arms has a bend located between two loops, the bend being closer to the outer end of the dipole arm.

12. A Low Band (LB) dipole comprising:

a plurality of dipole arms; and a balun stem, wherein each of the dipole arms comprises:

an inner end and an outer end, and a plurality of loops, wherein the loop closest to the inner end of each dipole arm is mechanically coupled to the balun stem, wherein a loop closest to the outer end of each dipole arm has a volume that is greater than an adjacent loop, and wherein a shape of the loop closest to the outer end of the dipole arm comprises two bends, one at each lateral side of the loop closest to the outer end of the dipole arm.

13. The LB dipole of claim 12, wherein each of the dipole arms comprises a plurality of slotted tuning features disposed between adjacent arm loops.

14. A multiband antenna, comprising:

a plurality of first dipoles configured to radiate in a first frequency band; and one or more second dipoles configured to radiate in a second frequency band, wherein the first frequency band is higher than the second frequency band, the one or more second dipoles each having a plurality of dipole arms, wherein each of the dipole arms comprises a plurality of loops, wherein the plurality of loops of each dipole arm comprise a coupling loop and a plurality of arm loops, wherein the coupling loop of each dipole arm is located closest to an inner end of the dipole arm compared to the arm loops, and wherein an arm loop closest to an outer end of each of the dipole arms has a volume that is greater than an adjacent arm loop.

15. The multiband antenna of claim 14, wherein each of the coupling loops comprises a slot for mechanical coupling with a balun stem tab, and wherein the balun stem tab comprises a solder joint for electrically coupling a balun stem trace with the coupling loop of each dipole arm.

16. The multiband antenna of claim 14, wherein a shape of the arm loop closest to the outer end of each dipole arm comprises two bends, one at each lateral side of the arm loop.

17. The multiband antenna of claim 14, wherein each of the dipole arms comprises a plurality of slotted tuning features disposed between adjacent arm loops.

* * * * *